July 3, 1934. E. PAPPERT 1,964,828
ADJUSTABLE ENDPIECE FOR SPECTACLES
Filed April 24, 1933
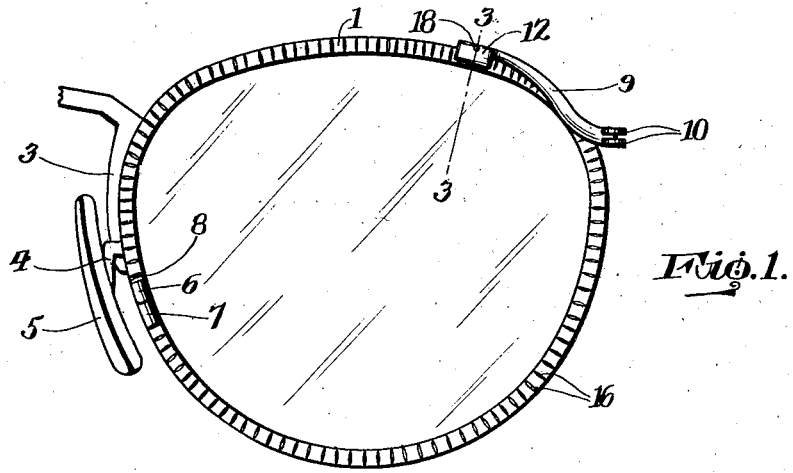
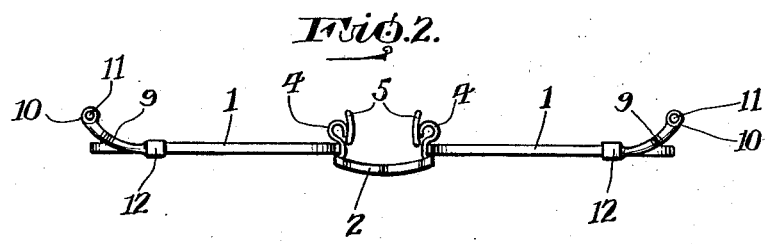
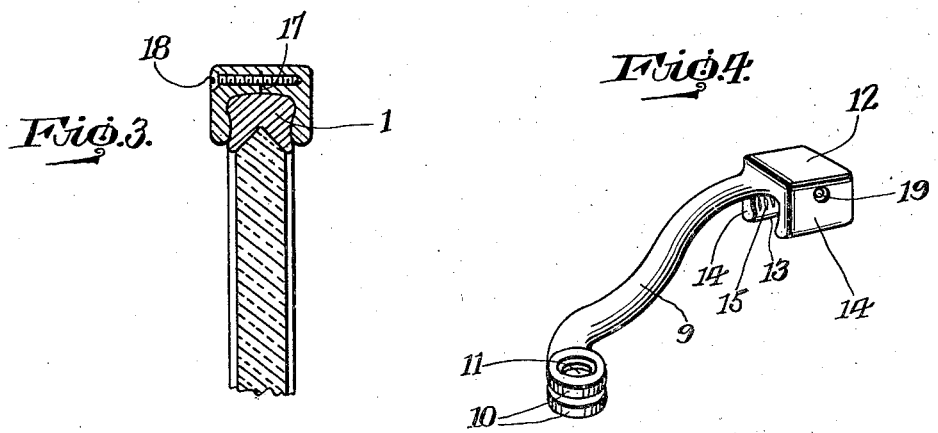
Inventor
Emanuel Pappert
By Geo. P. Kimmel
Attorney Patented July 3, 1934

1,964,828

UNITED STATES PATENT OFFICE 1,964,828

ADJUSTABLE ENDPIECE FOR SPECTACLES

Emanuel Pappert, Long Island City, N. Y., assignor to George P. Kimmel, Washington, D. C.

Application April 24, 1933, Serial No. 667,707

2 Claims. (Cl. 88—53)

This invention relates in general to spectacles and particularly has reference to a spectacle of the rimmed type having an endpiece adjustably connected thereto.

In previous practice, it has been customary to provide rimmed spectacles with fixedly connected endpieces for the purpose of providing temple connections. These have usually been positioned on the horizontal median line of the lenses and have been adjustable only by bending in order to properly align and position the spectacles on the face.

Recently there has come into use a type of spectacle in which the endpieces are positioned above the horizontal median line of the lenses so that both the endpieces and the temples will lie above the normal useful field of side vision. However, in this type of spectacle a great difficulty has been involved in fitting the same to persons having different facial characteristics. Some persons have very narrow faces and others very broad faces and with the type of endpieces previously in use, it has been impossible to move the temple hinge joint inwardly or outwardly a sufficient distance to properly adjust the spectacles to these various widths of faces. Also, the other adjustments necessary have been very difficult to accomplish because of the shortness and stiffness of these previously used endpieces.

This invention therefore has for its object the provision of a spectacle having an endpiece which may be readily adjusted with respect to the spectacle frame in order to accommodate faces of various widths, and which will at the same time provide ample length and pliability to allow the other adjustments to be readily made. It is an object to provide such a structure which will be attractive in appearance and in which those portions of the rims and endpieces which coact with each other shall be so formed as to add to rather than detract from the appearance of the spectacle as a whole.

Other objects and advantages of this invention will become apparent from the following description taken in connection with the accompanying drawing, it being distinctly understood that the same are by way of illustration and example only and are not to be taken as in any way limiting the spirit or scope of this invention. The spirit and scope of this invention is to be limited only by the prior art taken in connection with the accompanying claims.

Referring now more particularly to the drawing in which like numerals indicate corresponding parts throughout:

Figure 1 is a rear view of one of the lens frames and associated endpiece of a spectacle constructed in accordance with this invention.

Figure 2 is a plan view of a pair of spectacles constructed in the manner illustrated in Figure 1.

Figure 3 is an enlarged sectional view taken along the line 3—3 of Figure 1.

Figure 4 is a detailed perspective view illustrating the endpiece of this invention.

In accordance with this invention, the spectacles illustrated in the drawing consist in general of a pair of lens rims 1 connected together at their nasal sides by means of a bridge 2 which may be of any suitable configuration. As illustrated, this bridge 2 is provided with a pair of downwardly extending legs 3 which are secured along the nasal edges of the rims 1 respectively. Secured to the rims 1 at the horizontal median of the lenses and adjacent the ends of the legs 3, there are positioned a pair of rearwardly extending arms 4 carrying nose pads 5 at their rearward ends. The rims 1 are split at points adjacent the lower ends of the legs 3, and the ends of each split rim are provided with tubular members 6 and 7 on their rear surfaces. One of these tubes 7 is preferably internally threaded for the purpose of receiving a screw 8 or the like which passes through the other tube 6 to secure the ends of the rim together.

The endpiece member consists of an elongated arm 9 having a bifurcated portion at one end thereof forming a pair of ears 10 adapted to receive the end of a temple between them. Each of the ears 10 is provided with an opening 11 therethrough for the purpose of accommodating a securing member to secure the temple in position. At its opposite end, the arm 9 is provided with a block 12 the lower portion of which is formed with a channel 13 therethrough adapted to fit around the lens rims 1. The sides or jaws 14 on opposite sides of the channel 13 are shaped to conform to the contour of the side walls of the lens rims 1 and are provided with internal serrations 15 adapted to interengage with the serrations 16 on the rims 1 when the endpieces are in place.

The block 12 is split at 17 for a portion of the distance between the channel 13 and the outer wall of the block. This enables the jaws 14 to be spread slightly in placing the endpiece on the rim. After they are so placed, a screw 18 is inserted in the opening 19 provided for that purpose and is tightened up to securely draw the jaws 14 into engagement with the opposite faces of the rims thus firmly positioning the endpieces on the rims.

As illustrated in Figure 1, it will be seen that the arms 9 are bent so as to lie rearwardly of the plane of the rims and so as to extend downwardly and outwardly substantially along the contour of the rims thus rendering it inconspicuous and unobjectionable. As illustrated in Figure 2, these arms 9 are likewise curved toward the rear so as to position the temple connections at points considerably to the rear of the plane of the rims thus allowing great adjustability. It is noted that the endpieces themselves may be mounted on the lens rims at any desired point so as to position the temple connections either a considerable distance outwardly or inwardly with respect to the lenses. Thus faces of various widths may be readily taken care of.

It is noteworthy that the serrations 16 on the lens rims are so formed as to take the place of the ordinary engraving usually employed on such constructions and thereby performing the double function of utility in connection with the attachment of the endpiece and of enhancing the appearance of the spectacle. The screw 18 is placed in the block 12 from the rear thereof and the opening 19 terminates short of the front face of this block. Neither the screw nor the opening will therefore affect the appearance of this device from the front. Likewise, the tubes 6 and 7 and the screw 8 are placed on the rear of the rims so that they will not be readily apparent from the front.

Although a screw has been provided for closing the jaws in clamping the endpiece on the rim, it is to be understood that this may be omitted and the resiliency of the endpiece material relied upon to keep the parts clamped firmly in place. Other various modifications in the details of construction and arrangements of parts set forth in this application may be made without departing from the spirit or scope of this invention as determined by the accompanying claims taken in connection with the prior art.

What I claim is:—

1. In a pair of spectacles, a lens rim adapted to receive a clamp, a clamp having jaws engaging the front and rear surfaces of the rim along a portion of its upper periphery, an elongated arm extending from said clamp in a direction parallel to said lens rim and thence to a position rearwardly of said lens rim, and a temple connection on the free end of said arm, said rim and said jaws having interengaging serrations thereon to prevent shifting of the clamp on the rim, said clamp being split between said jaws to enable them to be spread in positioning them on the rim, and means adjustably connecting said jaws for positively closing said split to clamp and hold said jaws rigidly in place.

2. In a pair of spectacles, a lens rim adapted to receive a clamp, a clamp having jaws engaging the front and rear surfaces of the rim along its upper periphery, an elongated arm extending from said clamp in a direction parallel to said lens rim and thence to a position rearwardly of said lens rim, and a temple connection on the free end of said arm, said rim and jaws having interengaging serrations thereon to prevent shifting of the clamp on the rim, the serrations on the rim extending substantially throughout its length to give the rim an engraved effect and to permit the attachment thereto at any desired point, said clamp being split between said jaws to enable them to be spread in positioning them on the rim and being resilient to cause the jaws to resiliently grip the rim, and means adjustably connecting said jaws for positively closing said split to clamp and hold said jaws rigidly in place.

EMANUEL PAPPERT.